(12) United States Patent
Freerk et al.

(10) Patent No.: US 7,706,059 B2
(45) Date of Patent: Apr. 27, 2010

(54) TUBE ATTACHMENT FOR MICROSCOPES

(75) Inventors: Axel Freerk, Goettingen (DE); Cornelia Bendlin, Goettingen (DE); Anke Vogelgsang, Goettingen (DE)

(73) Assignee: Carl Zeiss Microimaging GmbH, Jena (DE)

( * ) Notice: Subject to any disclaimer, the term of this patent is extended or adjusted under 35 U.S.C. 154(b) by 447 days.

(21) Appl. No.: 11/548,956

(22) Filed: Oct. 12, 2006

(65) Prior Publication Data

US 2007/0091424 A1 Apr. 26, 2007

(30) Foreign Application Priority Data

Oct. 13, 2005 (DE) .................. 10 2005 050 077

(51) Int. Cl.
*G02B 21/00* (2006.01)
(52) U.S. Cl. ........................ 359/379; 600/165
(58) Field of Classification Search ............ None
See application file for complete search history.

(56) References Cited

U.S. PATENT DOCUMENTS

| | | | | | |
|---|---|---|---|---|---|
| 3,622,233 | A | * | 11/1971 | Blood et al. ............. | 351/245 |
| 4,394,074 | A | * | 7/1983 | McMahon et al. ........ | 351/206 |
| 5,420,716 | A | * | 5/1995 | Fukaya .................... | 359/368 |
| 7,401,921 | B2 | * | 7/2008 | Baker et al. .............. | 351/245 |

FOREIGN PATENT DOCUMENTS

| DE | 37 08 633 | 10/1988 |
|---|---|---|
| DE | 692 15 479 | 9/1992 |

\* cited by examiner

*Primary Examiner*—Stephone B Allen
*Assistant Examiner*—Derek S Chapel
(74) *Attorney, Agent, or Firm*—Frommer Lawrence & Haug LLP

(57) ABSTRACT

A tube attachment for microscopes which facilitates visual microscope work particularly over extended periods and which can be used universally for different types of microscopes and, at the same time, can be produced economically using simple manufacturing techniques, it is suggested that a tube attachment is constructed as a holder which can be adjusted with respect to height and, optionally, with respect to angle and can be fastened directly to a binocular tube of a microscope. The holder includes two carriers which are displaceable axially relative to one another and which have a forehead rest and a chin support or one carrier with the forehead rest for a user, and devices are provided at the carriers for clamping the adjusting movements of the carriers.

4 Claims, 2 Drawing Sheets

TUBE ATTACHMENT FOR MICROSCOPES

CROSS-REFERENCE TO RELATED APPLICATION

This application claims priority of German Application No. 10 2005 050 077.3, filed Oct. 13, 2005, the complete disclosure of which is hereby incorporated by reference.

BACKGROUND OF THE INVENTION a) Field of the Invention

The invention is directed to a tube attachment for microscopes comprising a microscope stand with optical components for beam guidance and beam deflection, an illumination carrier arranged at the microscope stand, and a microscope tube.

b) Description of the Related Art

Generally, in order to work successfully with microscopes for extended periods of times the microscope must be comfortable to use and not cause fatigue. Therefore, many microscopes not only have a comfortable and handy arrangement of the operating elements, but are also already provided with a microscope tube which can be adjusted to any body size and displaced vertically in a continuous manner.

A great disadvantage in working with microscopes consists in that owing to the almost upright body posture of the user and the attitude of the user's head it may come about over extended periods at the microscope as a result of involuntary movements on the part of the user in a constant effort to achieve an optimal distance from the exit pupils of the eyepieces at the microscope tube that the exit pupils of the eyepieces not longer correspond, or correspond only partly, to the eye pupils of the user. This is a severe visual impediment for microscope work especially over extended periods of microscope use.

Auxiliary devices are known from ophthalmology, such as the auxiliary device described in DE 37 08 633 A1 for correcting ametropia for a user in binocular microscope tubes of surgical microscopes. This auxiliary device comprises a holder for the eyepieces which can be attached in a rotatable manner and which is outfitted with receptacles for eyeglasses. The receptacles are connected to one another by a telescope rod located at the distance of an eyeglass frame from the user's eye in order to afford possibilities for correcting defective vision in the user.

Further, DE 692 15 479 T2 discloses a contactless pressure measuring device and a method for measuring intraocular pressure in an eye. A supporting system for the patient's head comprising a chin support and a forehead rest is mounted at a base of the device.

OBJECT AND SUMMARY OF THE INVENTION

It is the primary object of the invention to provide a tube attachment for microscopes which facilitates visual microscope work particularly over extended periods of microscope work and which can be used universally for different types of microscopes and, at the same time, can be produced economically using simple manufacturing techniques.

This object is met in that a tube attachment for microscopes is constructed as a holder which can be adjusted with respect to height and, optionally, with respect to angle and can be fastened directly to a binocular tube of a microscope. The holder comprises two carriers which are displaceable axially relative to one another and which have a forehead rest and a chin support or one carrier with a forehead rest for a microscope user, and means are provided at the carriers for clamping the adjusting movements of the carriers.

The two carriers which are axially displaceable relative to one another are advantageously approximately L-shaped and extend so as to be aligned with one another. A leg of one carrier, which leg projects approximately at a right angle, has the forehead rest at its free end and a leg of the other carrier projecting approximately at a right angle has the chin support for a user at its free end.

The two approximately L-shaped carriers have axially extending longitudinal legs which are aligned with one another and which are guided in their end areas in a guide so as to be displaceable axially one on top of the other for the longitudinal adjustment of the chin support in order to individually adjust different distances of the chin support of the user of the microscope. The leg of the carrier for the forehead rest, which leg projects approximately at a right angle, has at its free end a guide for individually adapting the forehead rest to the anatomy of the forehead of a user.

The displacing movements of the carriers for the chin support and the forehead rest can preferably be blocked in any adjusting positions. The clamping of the adjustment movements of the two carriers in the intended pull-out directions is carried out in a simple manner, particularly by means of knurled screws.

An advantageous embodiment form consists in that the forehead rest can be adjusted with respect to angle and can be fixed by means of a clamping device so that a user can always adjust the optimal distance from the exit pupils of the eyepieces when the user is supported at the forehead rest, especially for working at the microscope for extended periods of time.

In a preferred further development of the holder, the carrier for the forehead rest has, at its longitudinal leg, fastening elements either for fastening to the surrounding members of the tube attachment for the eyepiece connection piece of the binocular tube or for fastening to the eyepiece connection piece itself. In particular, the fastening elements are constructed as two or four rods which are arranged parallel to one another and at a distance from one another and are fastened in openings which are provided in the longitudinal leg of the carrier for the forehead rest.

To fasten a tube attachment directly to the eyepiece connection piece of the microscope, the fastening elements are fastened in recesses of the eyepiece connection pieces. To fasten a tube attachment with surrounding members in which the fastening elements are fastened in recesses of the surrounding members, the tube attachment is placed on the eyepiece connection pieces of the microscope. The recesses in the surrounding members or the recesses in the eyepiece connection pieces have an outer boundary up to which the fastening elements are held in the recesses so as to be movably guided.

A variant consists in that the fastening elements are held so as to be secured axially in a frictional engagement, particularly by means of a screw connection, in the corresponding recesses of the surrounding members of the tube attachment for the eyepiece connection pieces or in the recesses of the eyepiece connection pieces themselves.

In a further preferred variant, the fastening elements are held so as to be secured axially in a positive engagement, particularly by means of an expansion connection, in the corresponding recesses of the surrounding members of the tube attachment for the eyepiece connection pieces or of the eyepiece connection pieces themselves for fast assembly and disassembly of the tube attachment.

Finally, it is preferable and essential that the forehead rest and the chin support are constructed as particularly flat profile members which are adapted to the profile of the user's forehead and chin.

In the novel tube attachment for microscopes it is essential that the forehead rest and the chin support for a user of a microscope make it easier to work while looking into the microscope particularly over extended periods because, after individually adapting the tube attachment to a user, an optimal distance from the exit pupils of the eyepieces is achieved automatically when the head of the user is supported on these supports when working at the microscope.

Owing to the angle adjustment of the forehead rest, which is also provided, an even more comfortable adjustment can be achieved for a user of the microscope so that the individual adaptation of the tube attachment to the anatomy of different users is further improved, and excellent conditions are provided for an optimal visual impression with a relaxed attitude of the head.

Further, because of its construction, the tube attachment can be applied universally for use in different types of microscope and, at the same time, can be produced simply and economically in technical respects relating to manufacture from a wide variety of materials adapted to the microscope tubes, and can be assembled and disassembled quickly and easily.

The invention will be described more fully in the following with reference to embodiment examples shown schematically in the drawings.

DESCRIPTION OF THE PREFERRED EMBODIMENTS

Figure 1:
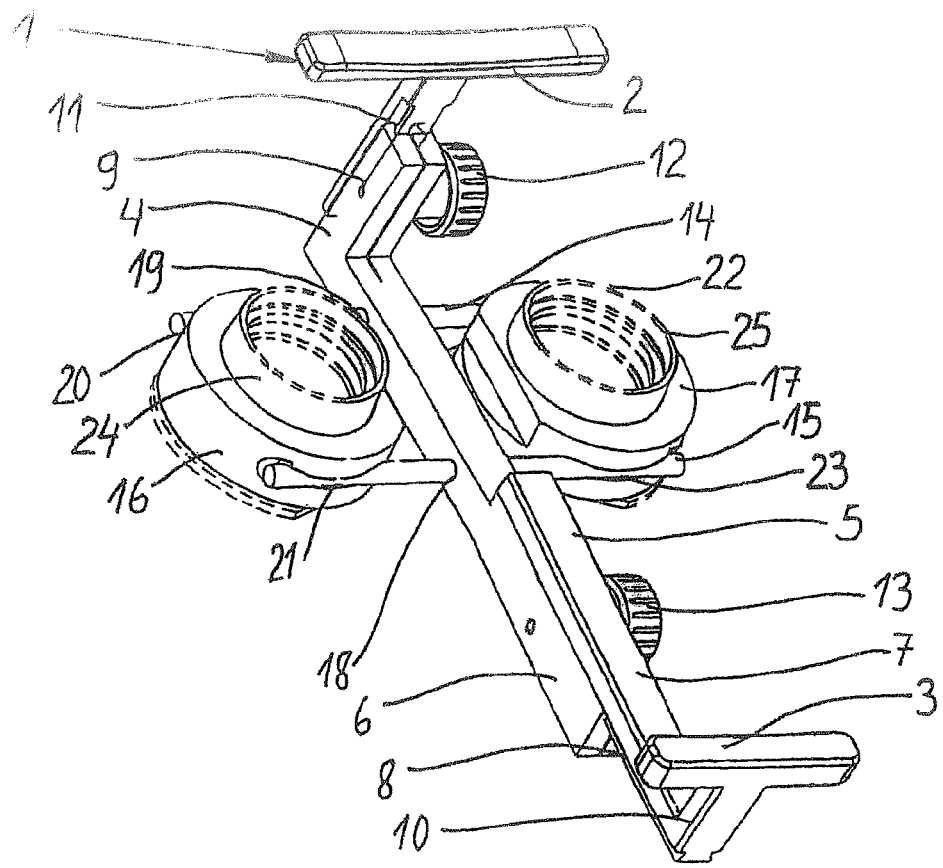
FIG. 1 shows a perspective view of a first embodiment example of a tube attachment for a binocular tube with a forehead rest and chin support.

FIG. 1 shows a tube attachment 1 with a forehead rest 2 and a chin support 3 which can be fastened directly to a binocular tube of a microscope. The tube attachment 1 which is constructed as a holder can be used for many different constructional forms of known microscopes.

In a first embodiment example according to FIG. 1, the tube attachment 1 comprises two approximately L-shaped carriers 4 and 5 which are axially displaceable relative to one another. The forehead rest 2 is arranged at carrier 4 and the chin support 3 is arranged at carrier 5. The two L-shaped carriers 4 and 5 which are axially displaceable relative to one another extend so as to be aligned with one another and comprise longitudinal legs 6 and 7 which extend axially so as to be aligned with one another and which are guided in their end areas in a guide 8 one on top of the other so as to be displaceable axially for longitudinal adjustment of the chin support 3.

Further, legs 9 and 10 which preferably project at right angles are arranged at the longitudinal legs 6 and 7. The leg 9 of the carrier 4 for the forehead rest 2, which leg 9 projects at right angles, has at its free end a guide 11 for adapting the forehead rest 2 to the anatomy of the forehead of a user of the microscope. The chin support 3 is arranged at the free end of the leg 10 of the carrier 5, which leg 10 projects at right angles.

The position of the forehead rest 2 and chin support 3 which is to be adjusted by a user by means of the guides 8 and 11 is locked, preferably in a frictional engagement, by means of clamping connections 12, 13, for example, by knurled screws, in order to block the movement in any adjusting positions.

In an embodiment form which is not shown in detail, the forehead rest 2 is additionally tiltable for improved adaptation to the anatomy of a user.

The forehead rest 2 and the chin support 3 are fastened to the legs 9, 10, which project at right angles, as flat, shaped elements that are adapted to the forehead and chin of the user.

Figure 2:
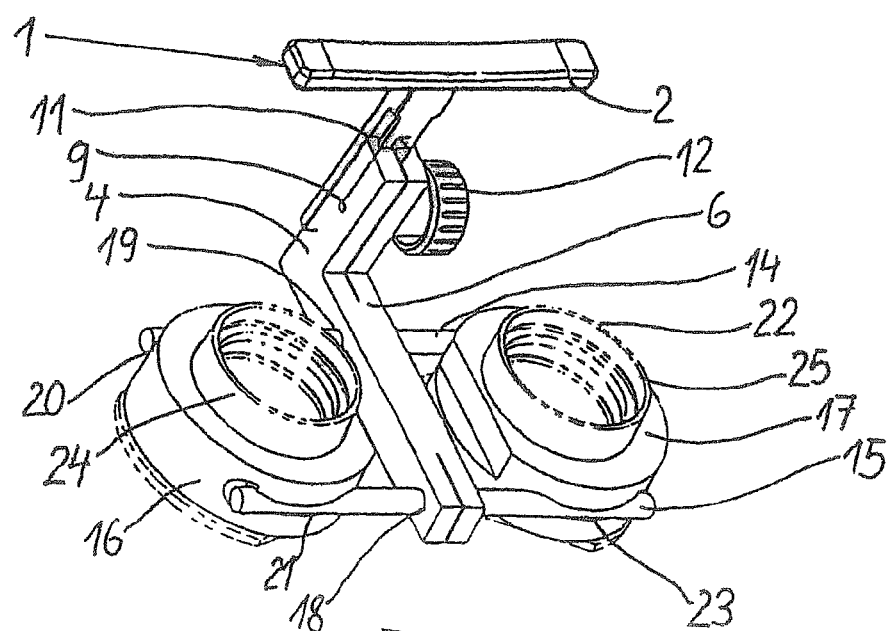
FIG. 2 shows a second embodiment example of a tube attachment with a forehead rest.

The tube attachment 1 contains fastening elements 14, 15 at the longitudinal leg 6 of the carrier 4 for the forehead rest 2 for fastening to the surrounding members 16, 17 of the tube attachment 1 that are placed on the eyepiece connection pieces 24, 25 according to FIGS. 1 and 2.

The fastening elements 14, 15 are constructed in particular as rods which are arranged parallel to one another and at a distance from one another and are inserted and fastened through openings 18, 19 in the longitudinal leg 6 of the carrier 4 for the forehead rest 2.

To fasten the rods 14, 15 to the surrounding members 16, 17 of the tube attachment 1 for the eyepiece connection pieces 24, 25 or directly to the eyepiece connection pieces 24, 25, two oppositely located recesses 20, 21 and 22, 23, respectively, are provided in the lateral surfaces of the surrounding members 16, 17 of the tube attachment 1 for the eyepiece connection pieces 24, 25 or at the eyepiece connection pieces 24, 25 themselves for receiving the rods 14, 15.

The recesses 20, 21, 22, 23 in the surrounding members 16, 17 of the tube attachment 1 or in the eyepiece connection pieces 24, 25 are suitably shaped so as to correspond to the shape of the rods and have in each instance an outer boundary up to which the rods 14, 15 are guided in a movable manner and held so as to be partially enclosed.

Each rod 14, 15 can also optionally comprise two rods. The rods 14, 15 are held in the recesses 20, 21, 22, 23 of the surrounding members 16, 17 of the tube attachment 1 in a frictional engagement, particularly by means of screw connections, or in a positive engagement, particularly by means of expansion connections.

FIG. 2 shows an analogous embodiment form of a tube attachment 1 which contains only one forehead rest 2, but no chin support 3.

Figure 3:
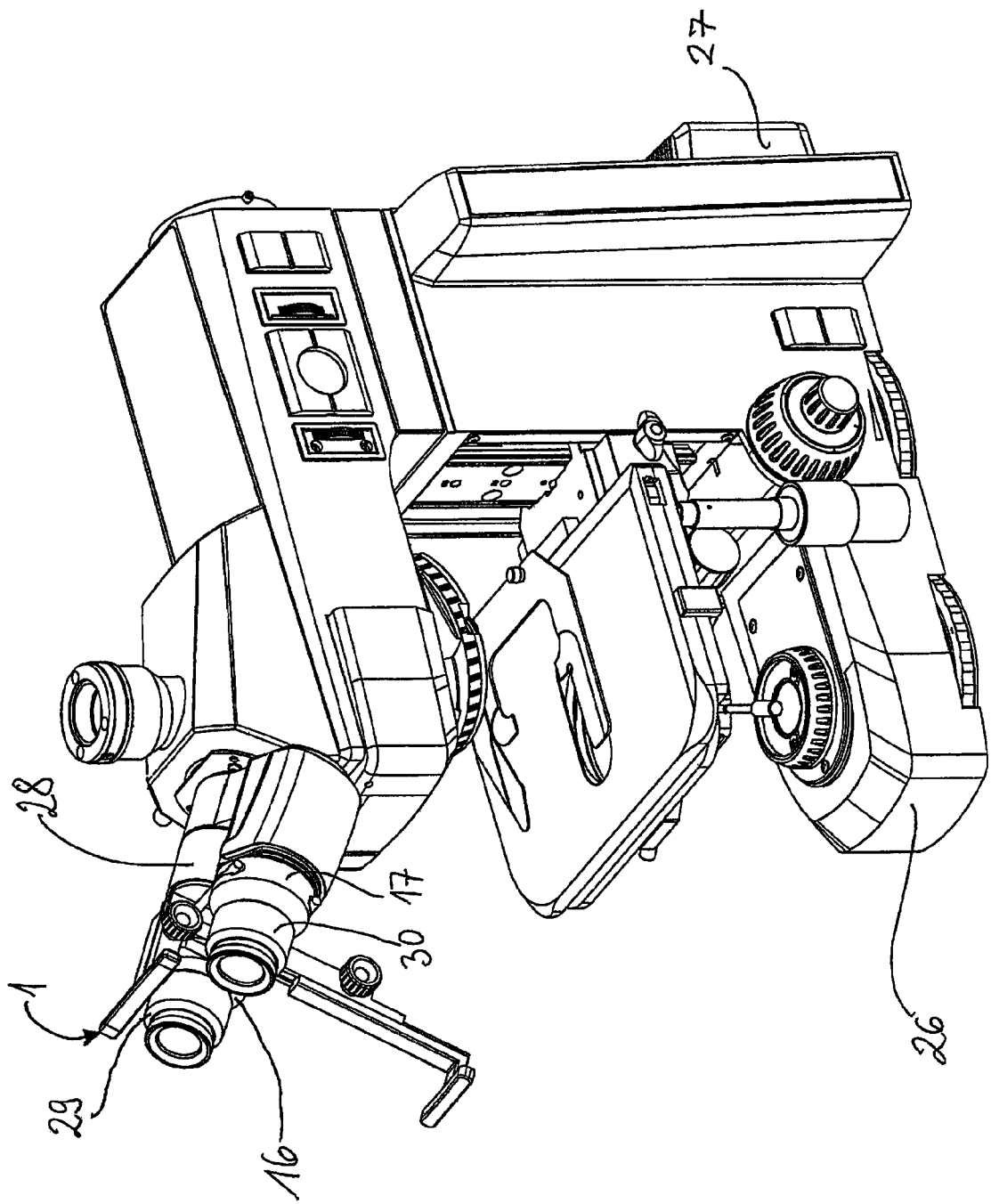
FIG. 3 shows the tube attachment fastened to a microscope.

FIG. 3 shows the tube attachment fastened to a microscope and includes a microscope stand 26 (with optical components for beam guidance and beam deflection), an illumination carrier 27, a microscope tube 28, an eyepiece 29 (inserted in eyepiece connection piece 24 of microscope tube), and an eyepiece 30 (inserted in eyepiece connection piece 25 of microscope tube).

While the foregoing description and drawings represent the present invention, it will be obvious to those skilled in the art that various changes may be made therein without departing from the true spirit and scope of the present invention.

REFERENCE NUMBERS 1 tube attachment
2 forehead rest
3 chin support
4 carrier for the forehead rest
5 carrier for the chin support
6 longitudinal leg of the carrier for the forehead rest 7 longitudinal leg of the carrier for the chin support
8 guide for the displacement of the chin support
9 leg of the carrier for the forehead rest
10 leg of the carrier for the chin support
11 guide for the displacement of the forehead rest
12 clamping device for the displacement of the forehead rest
13 clamping device for the displacement of the chin support
14 fastening element
15 fastening element
16 surrounding member of the tube attachment for the eyepiece connection pieces
17 surrounding member of the tube attachment for the eyepiece connection pieces
18 opening
19 opening
20 recess
21 recess
22 recess
23 recess
24 eyepiece connection piece
25 eyepiece connection piece
26 microscope stand with optical components for beam guidance and beam deflection
27 illumination carrier
28 microscope tube
29 eyepiece, inserted in eyepiece connection piece 24 of microscope tube
30 eyepiece, inserted in eyepiece connection piece 25 of microscope tube

What is claimed is:

1. A tube attachment for microscopes comprising:
a holder adjustable with respect to height and configured to fasten directly to binocular tubes of a variety of microscopes, said holder comprising:
  (a) two carriers which are displaceable axially relative to one another and which have a forehead rest and a chin support; or
  (b) one carrier with a forehead rest; and
a clamping device at each carrier for clamping adjusting movements of each carrier;
wherein fastening elements are constructed as rods, the rods being arranged parallel to one another at a distance from one another and being fastened in openings provided in a longitudinal leg of each carrier.

2. A tube attachment for microscopes comprising:
a holder adjustable with respect to height and configured to fasten directly to binocular tubes of a variety of microscopes, said holder comprising:
  (a) two carriers which are displaceable axially relative to one another and which have a forehead rest and a chin support; or
  (b) one carrier with a forehead rest; and
a clamping device at each carrier for clamping adjusting movements of each carrier;
wherein recesses for receiving fastening elements are arranged parallel to and across from one another in lateral surfaces of surrounding members for eyepiece connection pieces of the tube attachment for microscopes.

3. A tube attachment for microscopes comprising:
a holder adjustable with respect to height and configured to fasten directly to binocular tubes of a variety of microscopes, said holder comprising:
  (a) two carriers which are displaceable axially relative to one another and which have a forehead rest and a chin support; or
  (b) one carrier with a forehead rest; and
a clamping device at each carrier for clamping adjusting movements of each carrier;
wherein fastening elements are held so as to be secured axially in a frictional engagement, particularly by means of a screw connection, in recesses of surrounding members for eyepiece connection pieces of the tube attachment for microscopes or in recesses of the eyepiece connection pieces themselves.

4. A tube attachment for microscopes comprising:
a holder adjustable with respect to height and configured to fasten directly to binocular tubes of a variety of microscopes, said holder comprising:
  (a) two carriers which are displaceable axially relative to one another and which have a forehead rest and a chin support; or
  (b) one carrier with a forehead rest; and
a clamping device at each carrier for clamping adjusting movements of each carrier;
wherein fastening elements are held so as to be secured axially in a positive engagement, particularly by means of an expansion connection, in recesses of surrounding members of the tube attachment for microscopes or in recesses of the eyepiece connection pieces themselves.

* * * * *

UNITED STATES PATENT AND TRADEMARK OFFICE
CERTIFICATE OF CORRECTION

PATENT NO.         : 7,706,059 B2                                          Page 1 of 1
APPLICATION NO.    : 11/548956
DATED              : October 12, 2006
INVENTOR(S)        : Axel Freerk, Cornelia Bendlin and Anke Vogelgsang It is certified that error appears in the above-identified patent and that said Letters Patent is hereby corrected as shown below:

Title Page, Item (73) Assignee:

Please correct the Assignee from "Carl Zeiss Microimaging GmbH" to --Carl Zeiss MicroImaging GmbH--

Signed and Sealed this

Twenty-second Day of June, 2010

David J. Kappos
*Director of the United States Patent and Trademark Office*